United States Patent [19]

Kamerling

[11] 4,351,681
[45] Sep. 28, 1982

[54] CONTRAST ENHANCEMENT FILTER AND METHOD

[75] Inventor: Marc A. Kamerling, Santa Rosa, Calif.

[73] Assignee: Optical Coating Laboratory, Inc., Santa Rosa, Calif.

[21] Appl. No.: 264,475

[22] Filed: May 18, 1981

Related U.S. Application Data

[62] Division of Ser. No. 1,359, Jan. 5, 1979, Pat. No. 4,278,736.

[51] Int. Cl.³ .......................... B32B 31/18; G02B 1/08
[52] U.S. Cl. ....................................... 156/99; 156/101;
 156/104; 156/106; 156/250; 156/288; 156/334;
 156/327; 427/163
[58] Field of Search ............... 428/437, 411, 524, 527,
 428/910; 156/99, 101, 104, 106, 288, 334, 250,
 327; 427/163

[56] References Cited

U.S. PATENT DOCUMENTS

| | | | |
|---|---|---|---|
| 2,487,063 | 11/1949 | Marks | 350/155 |
| 3,027,288 | 3/1962 | Keslar | 156/104 |
| 3,185,020 | 5/1965 | Thelen | 350/164 |
| 3,208,902 | 9/1965 | Arond | 350/155 |
| 3,524,789 | 8/1970 | Olsen | 428/119 |
| 3,647,278 | 3/1972 | Makas | 350/155 |
| 3,833,289 | 9/1974 | Schuler | 350/175 NG |
| 3,873,868 | 3/1975 | Robinder | 313/112 |
| 3,922,440 | 11/1975 | Wegwerth | 428/437 |
| 4,025,688 | 5/1977 | Nagy | 428/1 |

*Primary Examiner*—Ellis P. Robinson
*Attorney, Agent, or Firm*—Flehr, Hohbach, Test, Albritton & Herbert

[57] ABSTRACT

Contrast enhancement filter having first and second transparent glass substrates with first and second surfaces with the first surface of each facing the medium in which the filter is disposed. A sheet-like circular polarizer is provided formed of stretched plastic members covered by layers of cellulose acetate butyrate. The circular polarizer is disposed between the first and second glass substrates and faces the second surfaces of the glass substrates. A dried plastisol primer layer is disposed on the surface of the layers of cellulose acetate butyrate facing the glass substrates. First and second layers of polyvinyl butyral adhesive secure the layers of cellulose acetate butyrate carried by the circular polarizer with the primer layers thereon to the second surfaces of the glass substrates. An anti-reflection coating is disposed on the first surface of the first substrate.

A method for manufacturing a contrast enhancement filter which comprises the steps of providing a sheet-like circular polarizer formed of stretched plastic members and having outer layers of cellulose acetate butyrate. A thin film of optical clear plastisol primer is applied on the outer surfaces of the cellulose acetate butyrate layers of the circular polarizer. The primer is then dried. A transparent substrate is provided with first and second surfaces. A layer of a polyvinyl butyral adhesive is then applied to the second surface of the first glass substrate. The circular polarizer with its primer layer thereon is placed on the layer of polyvinyl butyral adhesive. Another layer of polyvinyl butyral adhesive is then placed on the other side of the circular polarizer. A second glass substrate having first and second surfaces with the second surface facing the polyvinyl butyral adhesive is placed in the sandwich. The various parts in the sandwich are then secured into a temporary unitary assembly. Air is evacuated from between the parts and the layers. Heat and pressure is applied to the assembly to cause the parts to be permanently bonded into a unitary assembly.

8 Claims, 2 Drawing Figures

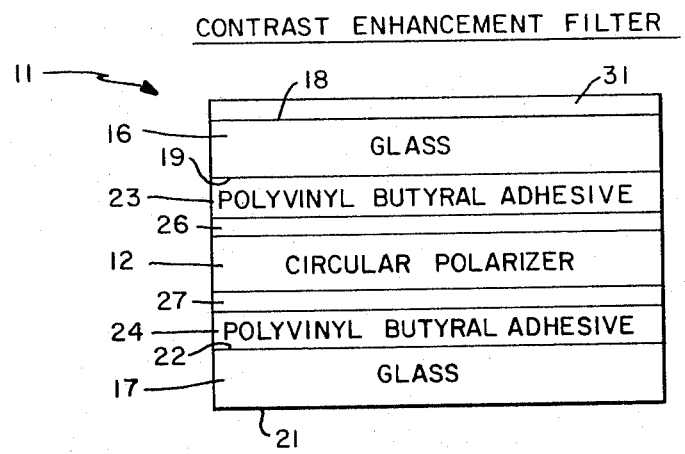
FIG.—1
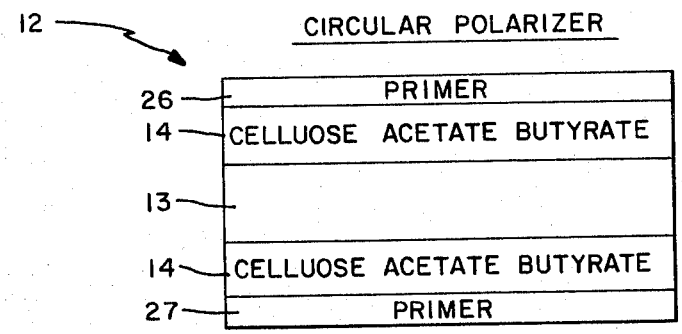
FIG.—2

CONTRAST ENHANCEMENT FILTER AND METHOD

This is a division of application Ser. No. 1,359 filed Jan. 5, 1979, now U.S. Pat. No. 4,278,736.

Contrast enhancement filters have heretofore been provided. For example, as disclosed in said U.S. Pat. No. 3,873,868, the light filtering film which is utilized on the display tube is disposed within the bonding material. Contrast enhancement filters separate from the face plate have also heretofore been provided. However, in connection with such filters it has been found that it is very difficult to obtain good bonding between the circular polarizer which is utilized and the bonding material used to join the circular polarizer to glass substrates between which the circular polarizer is disposed. There is therefore a need for a new and improved contrast enhancement filter.

The contrast enhancement filter consists of first and second transparent substrates with first and second surfaces with the second surface of each of the substrates facing the medium in which the filter is disposed. A sheet-like circular polarizer formed of stretched plastic members covered by layers of cellulose acetate butyrate is disposed between the first and second substrates and faces the second surface of the substrates. A dried plastisol primer layer is disposed on the outer surfaces of the layers of cellulose acetate butyrate facing the glass substrates. First and second layers of polyvinyl butyral adhesive secure the cellulose acetate butyrate layers of the circular polarizer with the primer thereon to the second surfaces of the glass substrates. The glass substrates and the circular polarizer are bonded into a unitary assembly by the polyvinyl butyral adhesive layers.

In general it is an object of the present invention to provide a contrast enhancement filter and method in which a circular polarizer formed of plastic is bonded between glass substrates.

Another object of the invention is to provide a filter and method of the above character in which polyvinyl butyral adhesive layers are utilized for bonding the circular polarizer to the glass substrates.

Another object of the invention is to provide a filter and method of the above character in which a plastisol primer is utilized for securing the circular polarizer to the polyvinyl butyral adhesive layers.

Another object of the invention is to provide a filter and method of the above character in which the adhesion is sufficiently good so that when an assembly is completed, it can be cut into smaller parts and so that the filter assembly will withstand certain environmental conditions and subsequent assembly and mounting conditions.

Additional objects and features of the invention will appear from the following description in which the preferred embodiment is set forth in detail in conjunction with the accompanying drawings.

FIG. 1 is a cross-sectional view of a constast enhancement filter incorporating the present invention.

FIG. 2 is a cross-sectional view of the circular polarizer which is utilized in the present invention.

The contrast enhancement filter of the present invention as shown in FIG. 1 includes a circular polarizer 12. The circular polarizer 12 is of a conventional design and typically consists of a plurality of layers of plastic with the inner layer 13 consisting of two stretched plastic members one of which is a linear polarizer and the other of which is a quarter wave retardation plate. For protection against humidity and scratching and other environmental considerations, this inner layer 13 is typically covered with first and second plastic layers 14 which are thermally bonded to the center inner layer 13.

The circular polarizer 12 is disposed between first and second glass substrates 16 and 17 each of which has first and second surfaces with the first substrate 16 having a first surface 18 and a second surface 19 and the second substrate 17 having a first surface 21 and a second surface 22. In the present embodiment, the surfaces of the substrate are planar because of the characteristics of the circular polarizer which is utilized which cannot accommodate bending. The glass substrates are transparent and can have a thickness ranging from 0.05 inches up to approximately ⅛ inch. Polyvinyl butyral adhesive layers 23 and 24 are utilized for securing the glass substrates.

In order to promote adhesion between the polyvinyl butyral adhesive layers and the cellulose acetate butyrate layers of the circular polarizer, primer layers 26 and 27 are utilized. The material which is utilized for the primer layers 26 and 27 is a plastisol primer which has a synthetic resin base and is identified as the A-1100-B for ceramic surfaces supplied by B. F. Goodrich Adhesive Products of Akron, Ohio 44318.

An anti-reflection coating 31 of the type described in U.S. Pat. No. 3,185,020 is provided on the first surface 18 of the glass substrate 16.

In manufacturing the contract enhancement filter 11, the glass substrates 16 and 17 as well as the circular polarizer 12 are cut to the desired size for the filter which is desired. The circular polarizer 12 has its outer surfaces thoroughly cleaned. The circular polarizer is then dipped in the A-1100-B primer so that there is provided a thin film of the primer on each side of the circular polarizer and adhering to the outer surface of the cellulose acetate butyrate layers of the circular polarizer. It has been found that it is preferable to apply the primer by a dipping process. However, the primer if desired, can be sprayed on or brushed on.

The primer is transparent and care must be taken that the primer does remain transparent after it is provided on the circular polarizer. For this reason, there should be no runs or streaks in the primer. In connection with the dipping process, it has been found that it is desirable to mix the primer with toluene. One mixture found to be suitable has a ratio of one part of primer to one part of toluene. The primer is then dried at room temperature for a period of fifteen minutes or more or alternatively at 160° F. in a circulating hot air oven for approximately two minutes. In connection with the present invention, it is preferable to dry the primer in a clean atmosphere at room temperature. In the drying operation, the primer should be observed to see if any milky white areas occur. If there are milky white areas, the primer is defective. It should be transparent throughout.

The glass substrates 16 and 17 and the circular polarizer 12 after it has been provided with the primer coatings 26 and 27 are brought into a clean room and are assembled into a sandwich such as shown in FIG. 1. The clean room is preferably temperature and humidity controlled. The sandwich which is shown in FIG. 1 is formed after each of the parts in the sandwich have been thoroughly cleaned on both sides. By way of example, the adhesive layer can then be placed on the glass. Thereafter, the circular polarizer with one of its primer layers can be placed on the polyvinyl butyral layers. The next polyvinyl butyral adhesive layer 23 can be placed on the circular polarizer 12 and thereafter, the first glass substrate 16 can be placed on the polyvinyl butyrate adhesive layer 23 with its first surface 18 carrying the anti-reflection coating facing outwardly. This entire assembly can then be bonded together temporarily such as by taping the outer edges of the same so that the parts remain in the sandwich as stacked. This taped assembly is then placed in a vacuum chamber and the entire assembly is evacuated so that as much air as possible is removed. Alternatively, the sandwich can be placed in a pliable nylon bag and the bag evacuated to remove air from between the parts. Thereafter, the bag containing the assembly can be placed in an autoclave which is a conventional pressure vessel and the assembly subjected to an elevated pressure and temperature for a period of time to thermally bond the parts into a permanent unitary assembly. Typically the parts can be treated in the autoclave at a temperature ranging from 200° F. to 220° F. and preferably 210° F. and a pressure ranging from 130 psi to 170 psi and preferably a pressure of approximately 150 pounds per square inch for a period of time ranging from 45 to 75 minutes and preferably 60 minutes. The parts in the autoclave are then cooled by the use of a heat exchanger and forced air and water and then the pressure is reduced to atmospheric.

The treatment under pressure and at elevated temperature is the lamination process which removes any remaining air from between the layers and therefore makes the entire assembly optically transparent. At the same time, the polyvinyl butyral is heated to a point at which it serves as a hot melt adhesive and any air which has been absorbed by the same becomes entrapped within the polyvinyl butyral so that it cannot escape. The use of the polyvinyl butyral adhesive is particularly advantgeous because of this air encapsulation feature. It is this feature which makes its use much preferable to that of an epoxy as an adhesive.

The circular polarizer can be of any conventional color which is provided. Particularly a neutral density, an amber color or a red color. A circular polarizer is utilized in the invention of the present filter because it is particularly effective in reducing specular reflection from objects behind the contrast enhancement filter.

The filter of the present invention is typically used in conjunction with a display tube of a conventional type or other display such as gas plasma or light emitting diode (L.E.D.) which has a transparent face plate in one wall thereof. Typically light generating layer is disposed adjacent the inner side of the face plate. The contrast enhancement filter of the present invention is intended to be utilized either as a free standing filter in front of the face plate of such a tube or other device. However, if desired, it can be cemented to the face plate of a display tube or device.

The use of a circular polarizer in conjunction with the present invention is advantageous in that it minimizes reflection back of light to the user of a display tube which emanates from the front side of the display tube. The anti-reflection coating which is provided on the front surface of the first substrate 16 also minimizes reflections from the first surface of the glass substrate 16.

In connection with the present invention it has been found that the use of the primer layer on the cellulose acetate butyrate outer surfaces of the circular polarizer promotes good adhesion between the polyvinyl butyral adhesive and the cellulose acetate butyrate without impairing the optical qualities of the filter. In fact, it has been found that adhesion is so good that the filter can be formed in larger parts and then it can be cut apart by a saw into smaller parts in order to reduce the cost of making such smaller parts.

From the foregoing, it can be seen that there has been provided a new and improved contrast enhancement filter which has improved qualities and which can be readily manufactured.

What is claimed is:

1. In a method for manufacturing a contrast enhancement filter, providing a circular polarizer having outer surfaces formed of cellulose acetate butyrate, placing a thin film of an optically clear primer on the outer surfaces of the cellulose acetate butyrate of the circular polarizer, drying the thin film of primer, providing first and second glass substrates, providing polyvinyl butyral adhesive layers, assembling the glass substrates, the circular polarizer and the polyvinyl butyral adhesive layers into a sandwich construction by placing the circular polarizer with the primer layers thereon between the glass substrates and placing the polyvinyl butyral adhesive layers between the circular polarizer and the glass substrates, temporarily bonding the sandwich into a unitary assembly, evacuating the air between the layers of the sandwich, subjecting the sandwich to an elevated temperature and pressure to a cause any remaining air within the sandwich to be absorbed by the polyvinyl butyral adhesive layers and to cause the polyvinyl butyral adhesive layers to form a hot melt adhesive to bond the parts of the sandwich into a unitary assembly, cooling the unitary assembly so that the polyvinyl butyral adhesive becomes a solid and reducing the pressure to atmospheric.

2. A method as in claim 1 wherein said primer is applied to the circular polarizer by dipping the circular polarizer into the primer.

3. A method as in claim 1 wherein the primer is applied by dipping the polarizer into a plastisol primer.

4. A method as in claim 2 wherein the primer is formed of a ratio of one part of plastisol primer to one part of toluene.

5. A method as in claim 3 wheren the primer is dried a room temperature for a period in excess of approximately fifteen minutes.

6. A method as in claim 1 wherein said assembly is subjected to a temperature of approximately 210° F. at a pressure of approximately 150 pounds per square inch for a period of 60 minutes.

7. A method as in claim 1 wherein said assembly is subjected to a pressure ranging from 130 psi to 170 psi, a temperature ranging from 200° F. 220° F. for a period of time ranging from 45 minutes to 75 minutes.

8. A method as in claim 1 together with the step of cutting the assembly into a plurality of separate smaller parts.

* * * * *